US012561220B2

(12) United States Patent
Zhu et al.

(10) Patent No.: US 12,561,220 B2
(45) Date of Patent: Feb. 24, 2026

(54) OUTPUTTING LOGS FROM A LOGGING SYSTEM

(71) Applicant: Dell Products L.P., Round Rock, TX (US)

(72) Inventors: Xiajun Zhu, Shanghai (CN); Mei Meng, Shanghai (CN); Zhenhua Meng, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/824,777

(22) Filed: Sep. 4, 2024

(65) Prior Publication Data

US 2026/0017164 A1     Jan. 15, 2026

(30) Foreign Application Priority Data

Jul. 12, 2024    (CN) ......................... 202410938942.8

(51) Int. Cl.
*G06F 11/30* (2006.01)
*G06F 11/34* (2006.01)

(52) U.S. Cl.
CPC ...... *G06F 11/3072* (2013.01); *G06F 11/3476* (2013.01)

(58) Field of Classification Search
CPC .......................... G06F 11/3072; G06F 11/3476
USPC .................................................... 714/45, 37
See application file for complete search history.

(56) References Cited

U.S. PATENT DOCUMENTS

| | | | | |
|---|---|---|---|---|
| 2019/0324649 | A1* | 10/2019 | Rodgers .................. | G06F 9/544 |
| 2020/0341868 | A1* | 10/2020 | Carpenter ........... | G06F 11/0709 |
| 2022/0398151 | A1* | 12/2022 | Nandavar ........... | G06F 11/0781 |
| 2023/0075820 | A1* | 3/2023 | Park ...................... | G06F 3/0604 |
| 2024/0069726 | A1* | 2/2024 | Virani .................. | G06F 3/0608 |

FOREIGN PATENT DOCUMENTS

CN          115827374 A   *   3/2023

OTHER PUBLICATIONS

"retroprom/pydecnet" GitHub. [https://github.com/retroprom/pydecnet] retrieved Aug. 25, 2025, 1 page, Aug. 18, 2022.

(Continued)

*Primary Examiner* — Chae M Ko
(74) *Attorney, Agent, or Firm* — Amin, Turocy & Watson, LLP

(57)     ABSTRACT

A logging system is disclosed, which is set with a primary filtering level and a secondary filtering level. A log message is saved in a log stream with a log level higher than or equal to the secondary filtering level in a buffer region. In response to a log filtering flag being set to the primary filtering level, a log message in the buffer region is output with the log level higher than or equal to the primary filtering level to a target region. In addition, all log messages in the buffer region to the target region are output in response to the log filtering flag being set to the secondary filtering level. Beneficially, unnecessary log messages are avoided from being output to the target region, while ensuring that required log messages are output to the target region, thereby improving the quality of log files.

20 Claims, 8 Drawing Sheets

(56) References Cited

OTHER PUBLICATIONS

"Commit 4f0d006" GitHub—retroprom/pydecnet. Aug. 31, 2020. [https://github.com/retroprom/pydecnet/commit/4f0d00612d08f864e26d2a435e15a33081146855] retrieved Aug. 25, 2025, 8 pages.
"pydecnet/pydecnet/decnet/logging.py" GitHub—retroprom/pydecnet. [https://github.com/retroprom/pydecnet/blob/master/pydecnet/decnet/logging.py] retrieved Aug. 25, 2025, 8 pages, Oct. 28, 2020.

* cited by examiner

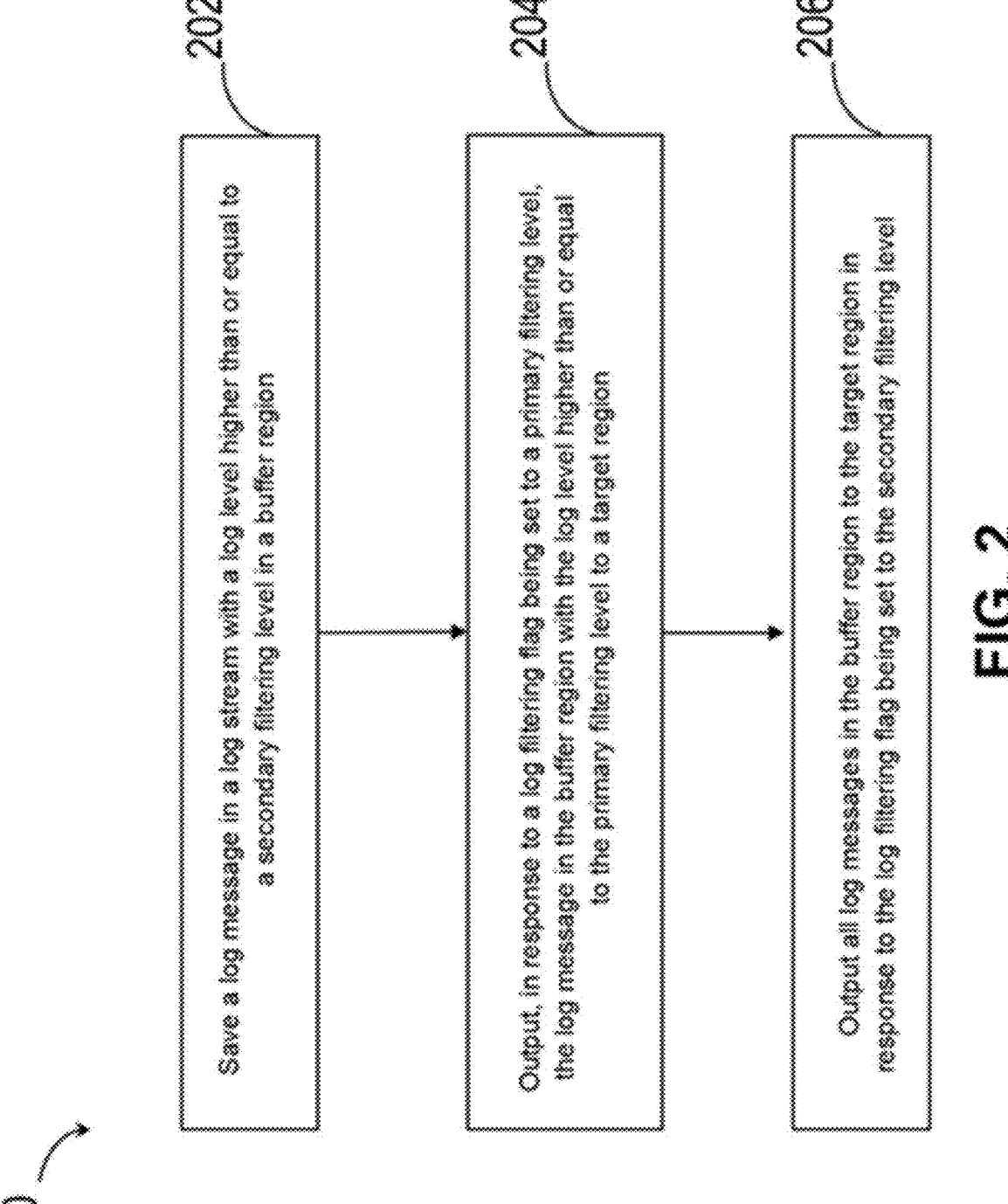

200

202
Save a log message in a log stream with a log level higher than or equal to a secondary filtering level in a buffer region 204
Output, in response to a log filtering flag being set to a primary filtering level, the log message in the buffer region with the log level higher than or equal to the primary filtering level to a target region 206
Output all log messages in the buffer region to the target region in response to the log filtering flag being set to the secondary filtering level

FIG. 2

OUTPUTTING LOGS FROM A LOGGING SYSTEM

RELATED APPLICATION

The present application claims the benefit of priority to Chinese Patent Application No. 202410938942.8, filed on Jul. 12, 2024, which priority application is hereby incorporated by reference herein into the present application in its entirety.

TECHNICAL FIELD

The present disclosure relates to the field of computers, and, more specifically, to a method, a device, and a computer program product for outputting logs from a logging system.

BACKGROUND

Log messages may usually be classified into the following categories: error logs, recording serious errors that occur in systems or applications; warning logs, indicating that there may be potential issues or unexpected situations, but the system can still continue to operate; information logs, providing general information about the normal operation of the system, such as the start and stop of services and completion of important operations; debugging logs, including detailed debugging information, and used for tracking execution processes of programs, values of variables, and the like; access logs, recording accesses to systems or resources; security logs, including security related events such as user login, permission changes, and violations of security policies; audit logs, used for recording key operations and events to meet compliance and audit requirements. Reviewing the log messages facilitates troubleshooting and diagnosing issues, optimizing system performance, monitoring system behaviors, evaluating system stability and reliability, improving and optimizing applications, and ensuring system security.

SUMMARY

Example embodiments of the present disclosure provide a method, a device, and a computer program product for outputting logs.

According to a first example embodiment of the present disclosure, a method for outputting logs from a logging system is provided, the logging system is set with a primary filtering level and a secondary filtering level, and the method includes saving a log message in a log stream with a log level higher than or equal to the secondary filtering level in a buffer region. The method further includes outputting, in response to a log filtering flag being set to the primary filtering level, the log message in the buffer region with the log level higher than or equal to the primary filtering level to a target region. In addition, the method further includes outputting all log messages in the buffer region to the target region in response to the log filtering flag being set to the secondary filtering level.

According to a second example embodiment of the present disclosure, an electronic device is provided, including: at least one processor; and coupled to the at least one processor and having instructions stored thereon, wherein the instructions, when executed by the at least one processor, cause the electronic device to perform actions including: saving a log message in a log stream with a log level higher than or equal to the secondary filtering level in a buffer region. The actions further include outputting, in response to a log filtering flag being set to the primary filtering level, the log message in the buffer region with the log level higher than or equal to the primary filtering level to a target region. In addition, the actions further include outputting all log messages in the buffer region to the target region in response to the log filtering flag being set to the secondary filtering level.

According to a third example embodiment of the present disclosure, a computer program product is provided. The computer program product is tangibly stored on a computer-readable medium and includes machine-executable instructions, wherein the machine-executable instructions, when executed, cause a machine to perform actions including: saving a log message in a log stream with a log level higher than or equal to the secondary filtering level in a buffer region. The actions further include outputting, in response to a log filtering flag being set to the primary filtering level, the log message in the buffer region with the log level higher than or equal to the primary filtering level to a target region. In addition, the actions further include outputting all log messages in the buffer region to the target region in response to the log filtering flag being set to the secondary filtering level.

It should be understood that the content described in this Summary is neither intended to limit key or essential features of the various embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals always represent identical or similar elements, and in the accompanying drawings:

FIG. 2 shows a flowchart of a method for outputting logs according to some example embodiments of the present disclosure;

DETAILED DESCRIPTION

Figure 1:
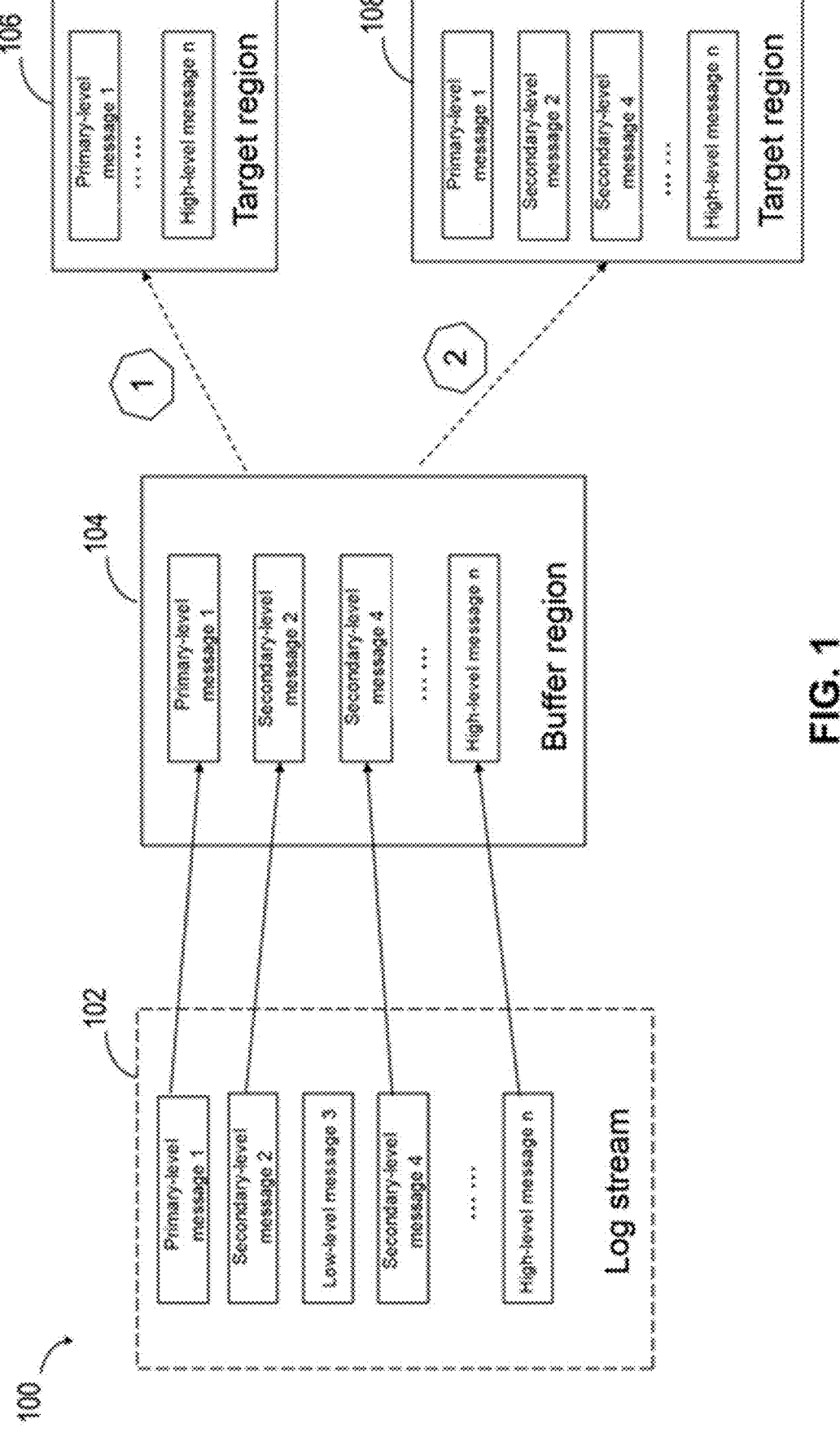
FIG. 1 shows a schematic diagram of an example environment for implementing some example embodiments of the present disclosure.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of the embodiments of the present disclosure, the term "include," "have," and similar terms thereof should be understood as open-ended inclusion, that is, "including but not limited to." The term "based on" should be understood as "based at least in part on." The terms "embodiment," "one embodiment," or "this embodiment" should be understood as "at least one embodiment."

As used herein, unless explicitly stated otherwise, the term "or" covers all possible combinations, unless not feasible. For example, if it is stated that a component may include A or B, unless otherwise explicitly stated or not feasible, the component may include A, or B, or A and B. As a second example, if it is stated that a component may include A, B, or C, unless otherwise explicitly stated or not feasible, the component may include A, or B, or C, or A and B, or A and C, or B and C, or A and B and C.

As mentioned above, in the event of an error or a failure occurring in a software program, reviewing logs usually facilitates identifying the cause of the problem. Usually, it is not necessary to review all logs, but rather logs that are highly relevant to the issues. Therefore, setting a proper log filtering level to output logs plays an important role in effectively finding useful log messages from log files. For example, if the log filtering level is error, only those with a log level (the degree of relevance to the issue, and a higher level indicates a higher degree of relevance) higher than or equal to the error level will be output to the log file, and other log messages lower than that level will not be output. However, when an error or a failure occurs, it is difficult to identify the cause by reviewing the error-level log messages without some useful information-level log messages. On the other hand, if the log filtering level is set too low, such as at a debugging level, in addition to more disk input/output (IO) consumption affecting performance, log files will be filled up with a large number of unnecessary log messages, which causes too fast log rotation and inconvenience in finding useful information.

In a client-server model system, a server-side program may handle hundreds or thousands of requests per minute and often face the dilemma of setting a proper log filtering level. Before the cause of an error or a failure is identified, we usually cannot predict or reproduce the error or failure, because the function framework may have changed and some local variables have disappeared. Therefore, once the opportunity to capture all log messages where the error occurred is missed due to the improper log filtering level, it is unlikely that we will have the opportunity to click and analyze again. Therefore, it is usually useless to adjust the log filtering level afterwards. Although the content of a memory may be saved to a disk for reviewing and analyzing the cause of failure through core dumps, it is difficult to review core dump files and requires a high level of professionalism from a reviewer.

Therefore, the present disclosure provides a solution for outputting logs. In the example embodiments of the present disclosure, by setting a primary filtering level and a secondary filtering level for a logging system, log messages with a log level higher than or equal to the secondary filtering level in a log stream are first saved in a buffer region, and how to output log messages in the buffer region to a target region is determined through a log filtering flag. Therefore, when there is no error during a session, log messages with a log level higher than or equal to the primary filtering level are output to the target region, and, when an error occurs during the session, all log messages in the buffer region are output to the target region. By using the solution, more detailed logs can be output when more detailed logs are requested or needed. The output function of the logging system is improved through two filtering levels, and users are allowed to filter log messages as requested or needed based on the log levels of incoming log messages, thereby improving the efficiency and quality of log recording.

FIG. 1 shows a schematic diagram of an overall environment 100 for implementing some embodiments of the present disclosure. As shown in FIG. 1, the environment 100 includes a log stream 102, a buffer region 104, and target regions 106 and 108. The log stream 102 includes a primary-level message 1, a secondary-level message 2, a low-level message 3, a secondary-level message 4, . . . , and a high-level message n, wherein a filtering level of the low-level message is lower than a filtering level of the secondary-level message, the filtering level of the secondary-level message is lower than a filtering level of the primary-level message, and the filtering level of the primary-level messages is lower than a filtering level of the high-level message. For example, the low-level message may be a message from a debugging log of a session, the secondary-level message may be a message from an information log of the session, the primary-level message may be a message from a warning log of the session, and the high-level message may be a message from an error log of the session.

In some embodiments, the log messages in the log stream 102 are not directly output to the target region, but are first partially saved to the buffer region 104, wherein the log messages with filtering levels higher than or equal to the secondary filtering level are saved to the buffer region 104, such as the primary-level message 1, the secondary-level message 2, the secondary-level message 4, . . . , and the high-level message n, while the low-level message 3 is not saved in the buffer region 104.

In some embodiments, when it is necessary to output the log messages in the buffer region 104 to the target regions 106, 108, a controller (not shown) in the environment 100 determines, according to the log filtering flag, a manner to output the log messages from the buffer region 104 to the target regions 106, 108. When the log filtering flag is the primary filtering level, the controller will output the log messages in the buffer region 104 according to a manner 1, that is, output the log messages with a log level (also known as the filtering level) higher than or equal to the primary filtering level to the target region 106. For example, as shown in FIG. 1, the primary-level message 1, . . . , and the high-level message n in the buffer region 104 are output to the target region 106.

On the other hand, when the log filtering flag is at the secondary filtering level, the controller will output the log messages in the buffer region 104 according to a manner 2, that is, output the log messages in the buffer region 104 with the log level higher than or equal to the secondary filtering level to the target region 108. All log messages in the buffer region 104 have the log level higher than or equal to the secondary filtering level, and therefore, the manner 2 is outputting all the log messages in the buffer region 104 to the target region 108. For example, as shown in FIG. 1, the primary-level message 1, the secondary-level message 2, the secondary-level message 4, . . . , and the high-level messages n in the buffer region 104 are all output to the target region 106.

In some embodiments, the log filtering flag is a primary filtering flag, indicating that there is no error log message in the incoming log messages, and therefore, there is no need to output overly detailed log messages. The log filtering flag being a secondary filtering flag indicates that there is already an error log message in the incoming log messages, and more information related to the errors needs to be reviewed, so more detailed information needs to be output.

In this way, by saving the part of the log messages that may be output in the log stream 102 to the buffer region 104, it is ensured that the required log messages can be reviewed when needed, and the manner of outputting the log messages from the buffer region to the target region is determined by the log filtering flag, which not only avoids outputting unnecessary log messages to the target region and occupying the space of the target region, but also ensures that the required log messages are output to the target region.

FIG. 2 shows a flowchart of a method 200 for outputting logs according to some embodiments of the present disclosure. The method 200 can be performed in the environment 100 as shown in FIG. 1. In addition, the numbering in the flowchart does not indicate the order in which these steps are performed. Some or all of these steps may be performed in parallel, or the performing order may be exchanged with each other, which is not limited in the present disclosure.

At block 202, the method 200 may save a log message in a log stream with a log level higher than or equal to the secondary filtering level in a buffer region. The log stream 102 includes a plurality of log messages, and these log messages are classified into high-level messages, primary-level messages, secondary-level messages, and low-level messages according to ranking of their filtering levels. Low-level log messages usually do not need to be reviewed due to their low relevance with potential failures or errors, while log messages above the secondary level have a high relevance with potential failures or errors and are therefore saved to the buffer region 104 before being output to the target region 106 or 108.

In some embodiments, in the environment 100 shown in FIG. 1, the controller saves log messages in the log stream 102 with a log level higher than or equal to the secondary filtering level to the buffer region 104. For example, if the information log message is at the secondary filtering level, the controller may save the information log message, warning log message, and error log message to the buffer region 104, while the debugging log message may not be saved to the buffer region 104.

At block 204, the method 200 may output, in response to the log filtering flag being set to the primary filtering level, log messages in the buffer region with a log level higher than or equal to the primary filtering level to the target region. For example, in the environment 100 shown in FIG. 1, the controller outputs the primary-level messages 1, . . . , and the high-level message n from the buffer region 104 to the target region 106. For example, when the warning log message is at the primary filtering level, the controller may output the warning log message and the error log message to the target region 106, while the information log message in the buffer region 104 may not be output to the target region 106.

At block 206, the method 200 may output all log messages in the buffer region to the target region in response to the log filtering flag being set to the secondary filtering level. For example, in the environment 100 shown in FIG. 1, the controller outputs all log messages in the buffer region 104 to the target region 108. For example, when the information log message is at the secondary filtering level, the controller may output the information log message, the warning log message, and the error log message to the target region 108.

By combining with the method described in FIG. 2, unnecessary log messages are avoided from being output to the target region and occupying space of the target region, while ensuring that the required log messages are output to the target region, thereby improving the quality of the log files.

In some embodiments, in order to dynamically change the manner of outputting logs from the buffer region based on the level of an incoming log message, a threshold log level is set in the logging system, and the threshold log level is higher than the primary filtering level. When the logging system detects that there is a log message in the incoming log stream that is equal to or higher than the threshold log level, the controller may be triggered to change the log filtering flag from the primary filtering level to the secondary filtering level, so that more detailed log messages may be output to the target region. The logging system may actively or passively output log messages from the buffer region to the target region and release the buffer region to avoid occupying the memory for a long time or consuming too much memory. In some embodiments, the active manner includes output triggered by the number, output triggered by time, and output triggered by switching of a log filtering flag, while the passive manner includes output triggered by an instruction.

In the output triggered by the number, a threshold number is set in the logging system. Once the number of cached messages in the buffer region reaches the threshold number, the controller may delete early log messages in the buffer region or output some or all of the latest log messages to the log file based on the current log filtering flag. For example, based on the log filtering flag, a part of log messages that exceed the threshold number in the buffer region are output from the buffer region to the target region, and the part of log messages that exceed the threshold number are deleted from the buffer region. This strategy is very meaningful because when a failure occurs, usually only the latest log messages are the most helpful, and those early log messages have lower importance, so deleting them has little impact on the analysis of the failure.

In the output triggered by time, a threshold time or a threshold time range is set in the logging system. Once the buffered messages in the buffer region exceed the time limit, the controller may delete early log messages in the buffer region or output some or all of the latest log messages to the log file based on the current log filtering flag. For example, based on the log filtering flag, a part of log messages that exceed the threshold time or the threshold time range in the buffer region are output from the buffer region to the target region, and the part of log messages that exceed the threshold time or the threshold time range are deleted from the buffer region. This may help avoid delaying the output of regular log messages (log messages with a level higher than or equal to the primary filter level, which are always output under normal circumstances) for too long.

In the output triggered by the switching of a log filtering flag, if during a session, once the logging system detects that the log filtering flag has switched from the primary filtering level to the secondary filtering level, the controller may immediately output all previously buffered log messages to the log file and release the buffer region, and subsequent log messages may be output to the log file according to the secondary filtering level, that is, the subsequent log messages in the log stream may no longer enter the buffer region. In addition, if the log filtering flag only switches from the primary filtering level to the secondary filtering level at the end of the session, only the normal log messages in the buffer region are output to the log file, and the buffer region is released.

In the output triggered by an instruction, the logging system outputs, in response to an instruction issued by a programmer, the log messages of the buffer region to the log file based on the log filtering flag and releases the buffer region. The method may usually be called at certain checkpoints in session processing to separate long-term log streams and output them separately. For example, a client-server session may typically be divided into several stages, such as a connection stage, a processing stage, and a response stage. A cross-stage log message typically has separate relevant information. Therefore, when the connection stage is successfully completed, regular log messages may be submitted to the log file, and the buffer region is cleared. If certain input parameter values from the connection are still needed in the log stream during the processing stage, they may be recorded again at the secondary filtering level so that the information can enter the buffer region again. In this way, not only can all useful log messages be saved in the buffer region, but also regular log messages may be output in a timely manner, thereby reducing the size of the log buffer region at each stage to avoid accumulating too many log messages.

In some embodiments, the switching of the log filtering tag from the primary filtering level to the secondary filtering level is triggered when the level in the log stream is higher than or equal to the threshold log level. The switching of the log filtering tag from the secondary filtering level to the primary filtering level may be triggered after the instruction for outputting log messages and clearing the buffer region is executed, or it may be switched in other manners, such as by programmers as needed, which is not limited here in the embodiments of the present disclosure.

Figure 3:
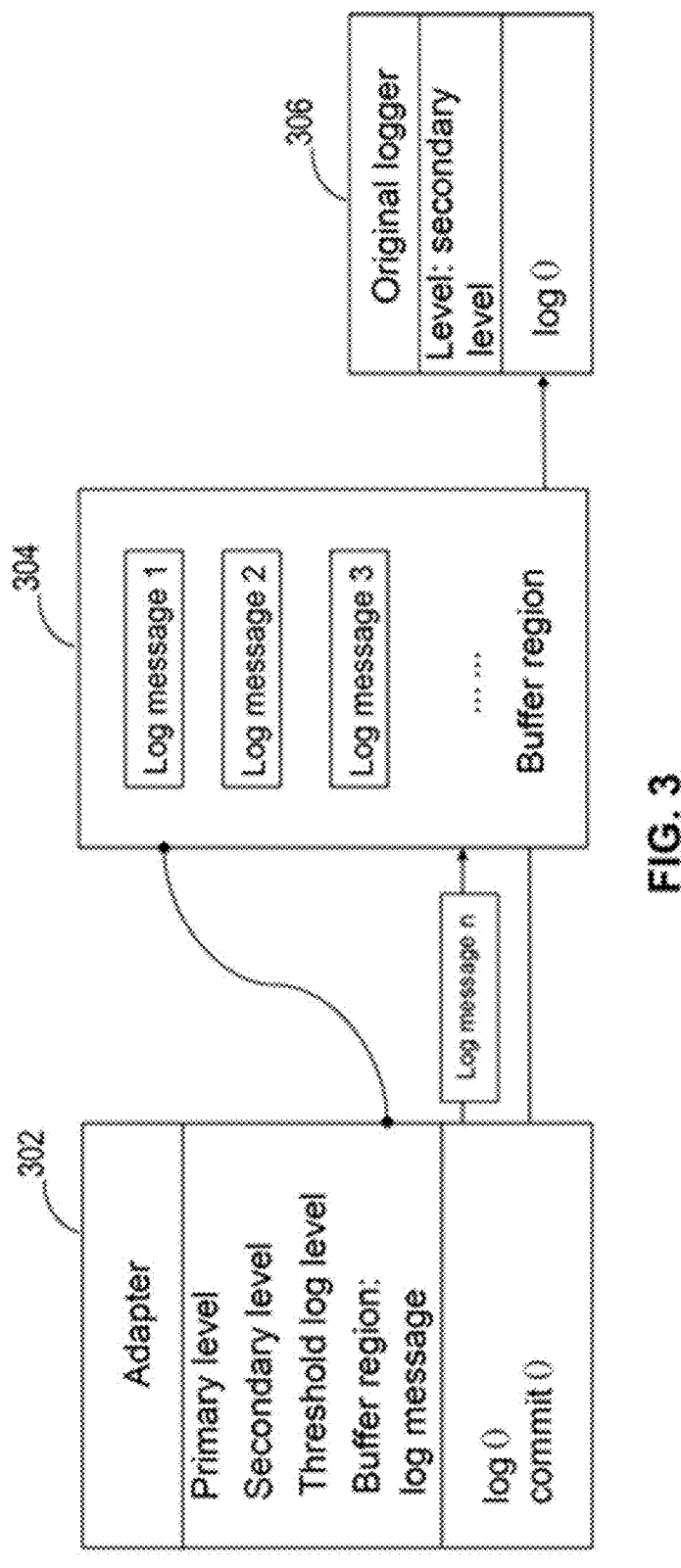
FIG. 3 shows a schematic diagram of an example of a method for outputting logs according to some example embodiments of the present disclosure.

Due to the widespread use of existing logging frameworks, it is meaningful to port the log output function described in the present disclosure to existing logging frameworks. Two methods for porting the log output function of the present disclosure to existing log frameworks will be introduced below with reference to FIG. 3 and FIG. 4. FIG. 3 shows a schematic diagram of an example 300 of a method for outputting logs according to some embodiments of the present disclosure. As shown in FIG. 3, in the method shown in the example 300, code related to the log output function of the present disclosure is added to a front-end of an original logger 306 (an existing logger), and the code corresponds to an adapter 302 in FIG. 3. The adapter 302 may be like a new logging framework with its own application programming interface (API) and filtering level. The original logger 306 is located behind the adapter 302, and its filtering level may be set to be equal to a secondary filtering level of the adapter, so it can always deliver messages from the adapter 302.

In some embodiments, an incoming log message n is always filtered by the adapter 302 at the secondary filtering level first, and then stored in a buffer region 304 after passing (that is, the level of the log message is higher than or equal to the secondary filtering level). A log filtering flag of the adapter is initially a primary filtering level. When a log message with a threshold level or higher that the threshold level is received, the log filtering flag of the adapter 302 may switch to the secondary filtering level. When the log message really needs to be output, for example, when a programmer submits a commit( ) function, the adapter 302 may filter the buffered log messages, such as a log message 1, a log message 2, a log message 3, . . . , from the buffer region 304 according to the current log filtering level, and then call the API of the original logger to output the log message.

Figure 4:
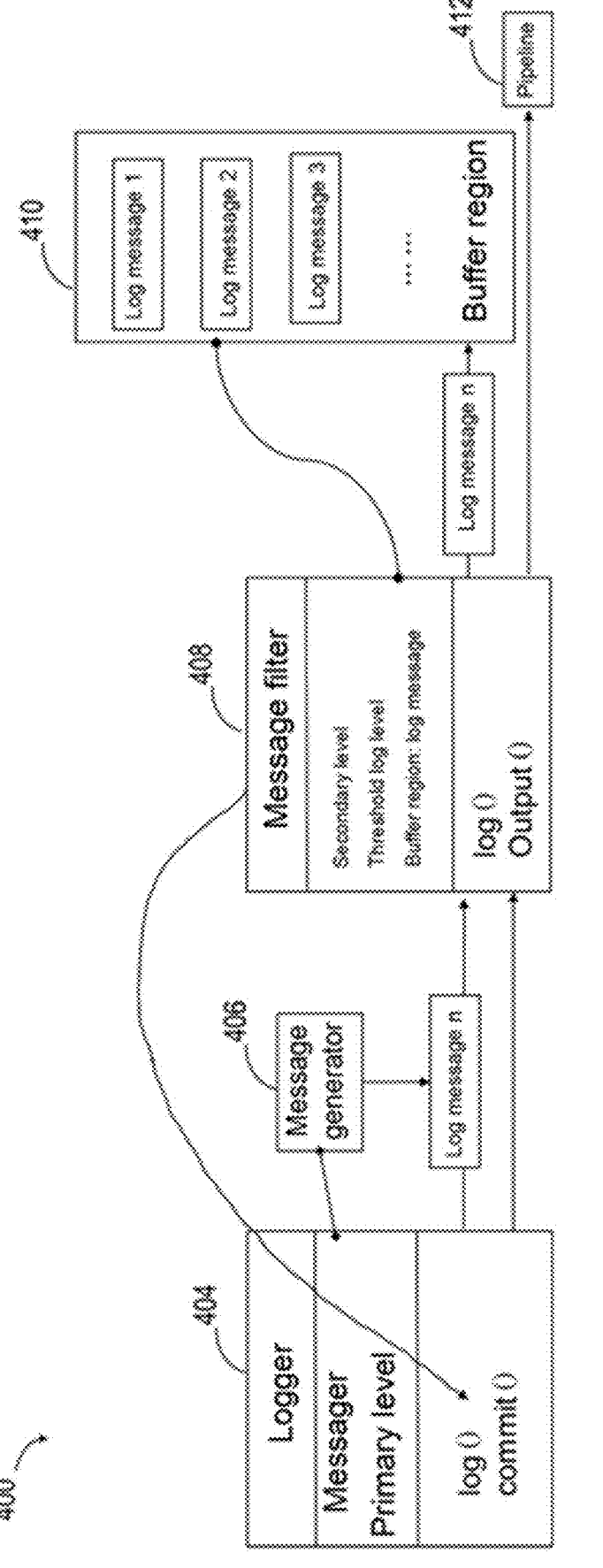
FIG. 4 shows a schematic diagram of another example of a method for outputting logs according to some example embodiments of the present disclosure.

FIG. 4 shows a schematic diagram of another example 400 of a method for outputting logs according to some embodiments of the present disclosure. As shown in FIG. 4, the most significant difference from the example 300 is that the existing logging framework has been modified in the method shown in the example 400, which enables the logging framework to more natively support the log output function of the present disclosure and has better performance. The overall idea of the method shown in the example 400 is saving a log message n to a buffer region 410 of the log stream instead of a target region just before it sinks to a pipeline 412, after the log message n is generated by a message generator 406 and formatted by a formatter.

In some embodiments, as shown in FIG. 4, the log message n is generated by the message generator 406 (which stores and serializes message parameters to form message content) and formatted by the formatter (used for presenting messages with various prefixes or suffixes) before being filtered by a message filter 408. The filtering level (also the log filtering flag) of the message filter 408 is set to a secondary filtering level, that is, log messages with a log level higher than or equal to the secondary filtering level may be saved to the buffer region 410. At the initial stage, the log filtering flag of a logger 404 is a primary filtering level. When a programmer submits a commit( ) function, the logger 404 calls an output( ) function in the message filter 408. The message filter 408 outputs normal log messages (with the log level higher than or equal to the primary filtering level) to the pipeline 412 by executing the output( ) function. When the log level of the log message n is higher than or equal to a threshold log level, the log filtering flag of the logger 404 changes to the secondary filtering level. When the filtering level of the logger 404 needs to output log messages and when the programmer submits the commit( ) function, the message filter 408 outputs log messages with a log level higher than or equal to the secondary filtering level to the pipeline 412. The pipeline 412 is responsible for outputting the log messages to the target region, such as a disk and a network.

In some embodiments, offsets and lengths of the log messages in the buffer region 410 are recorded in a meta array, so that if no log message above the threshold log level appears, normal log messages may be extracted separately for output. When a plurality of consecutive normal log messages are stored in the buffer region 410, their lengths may be merged into one length. For example, if a log message 2 has an offset of 50 and a length of 100, and a log message 3 has an offset of 150 and a length of 50, the offset of the log messages may not be recorded, but the length of the log message 2 may be recorded as 150. That is, by merging the lengths of the log message 2 and the log message 3, the log message 2 and the log message 3 may be merged into one log message element in the meta array. In this way, when only normal log messages are output after traversing the meta array, since the plurality of consecutive log messages are one element in the buffer region 410, they may be output together in one IO function call, which may reduce the number of IO function calls. In addition, if a log message above the threshold log level appears, since all log messages in the buffer region 410 are required, the entire buffer region 410 may be output in one IO function call. In this way, the time for outputting logs is saved, thereby improving the efficiency.

The log outputting method proposed in the present disclosure does not consume too much memory. If it is assumed that the average size of each log message is 200 characters and approximately 100 messages are stored in each session, the size of each session does not exceed 20 KB, which is completely acceptable. If the program is expected to run 1000 sessions simultaneously, it may consume 20 MB of memory. For a modern server-side program, compared with the benefits obtained through this method, such memory consumption is not significant. In addition, developers may estimate the total log size in a session and avoid consuming too much memory by selecting useful information to be stored in the log stream. In addition, memory consumption may be reduced through active and passive output manners as mentioned earlier.

Figure 5A:
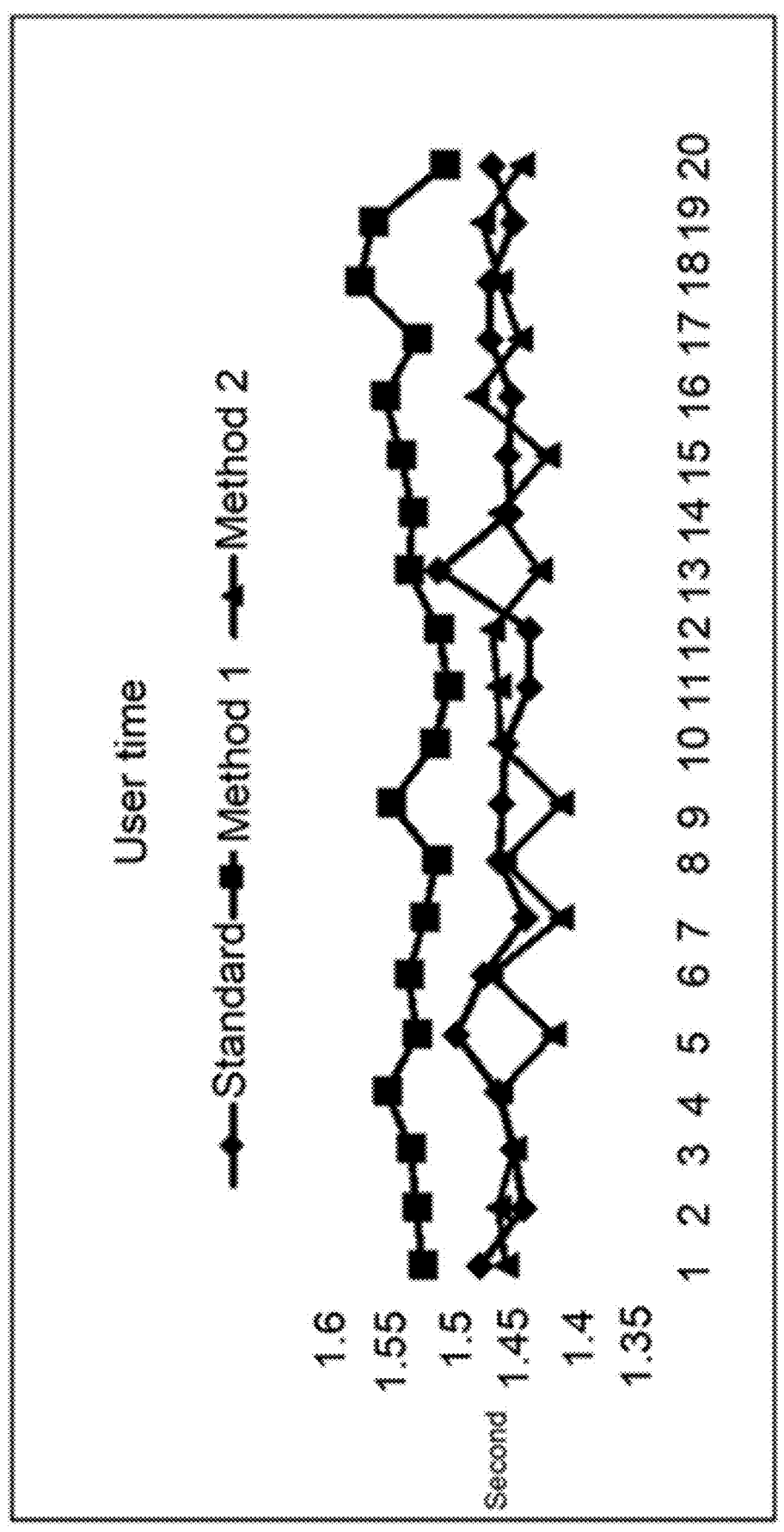
FIG. 5A to FIG. 5C respectively show schematic diagrams of effects of methods according to some example embodiments of the present disclosure.
Figure 5B:
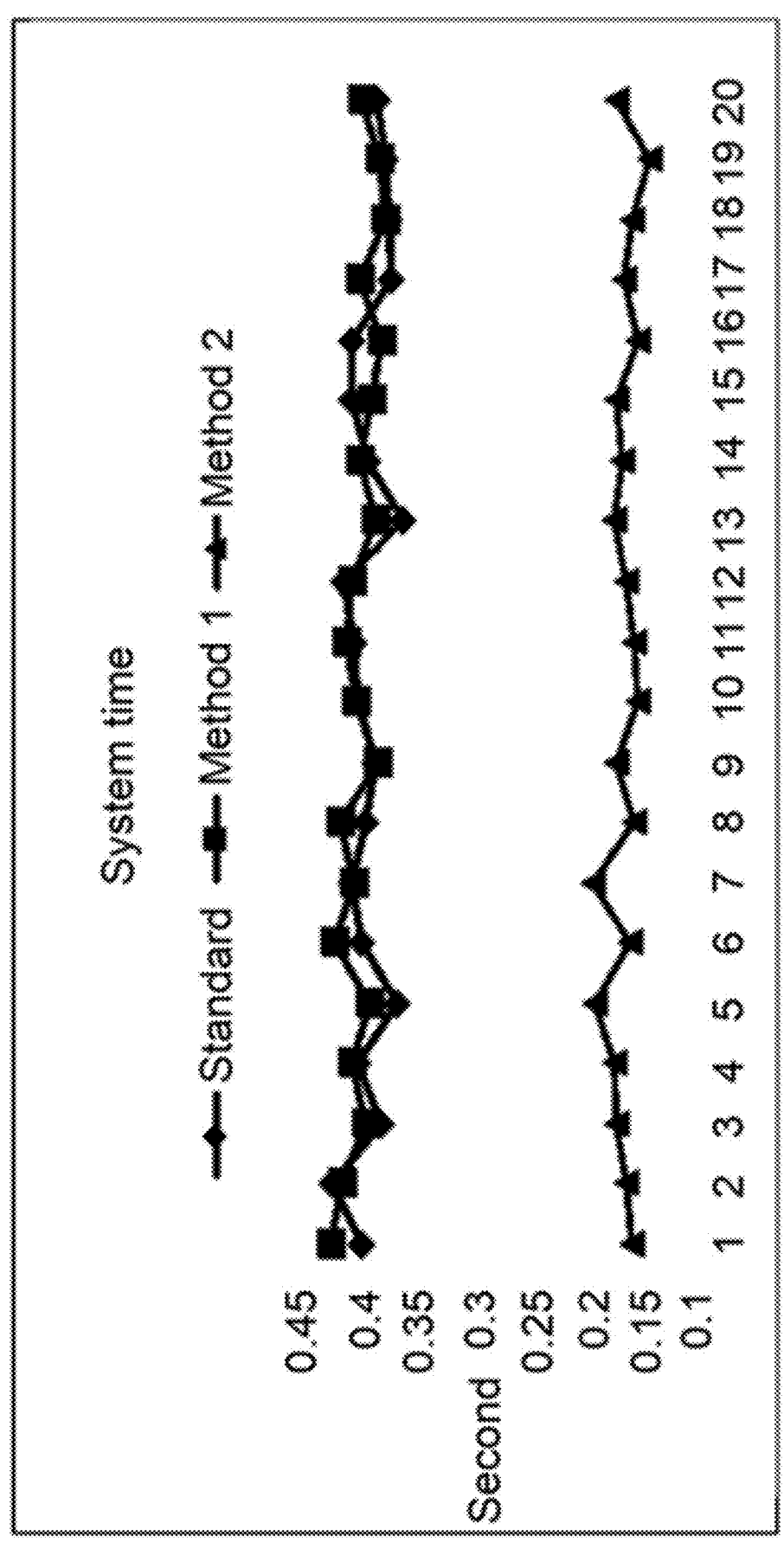
Figure 5C:
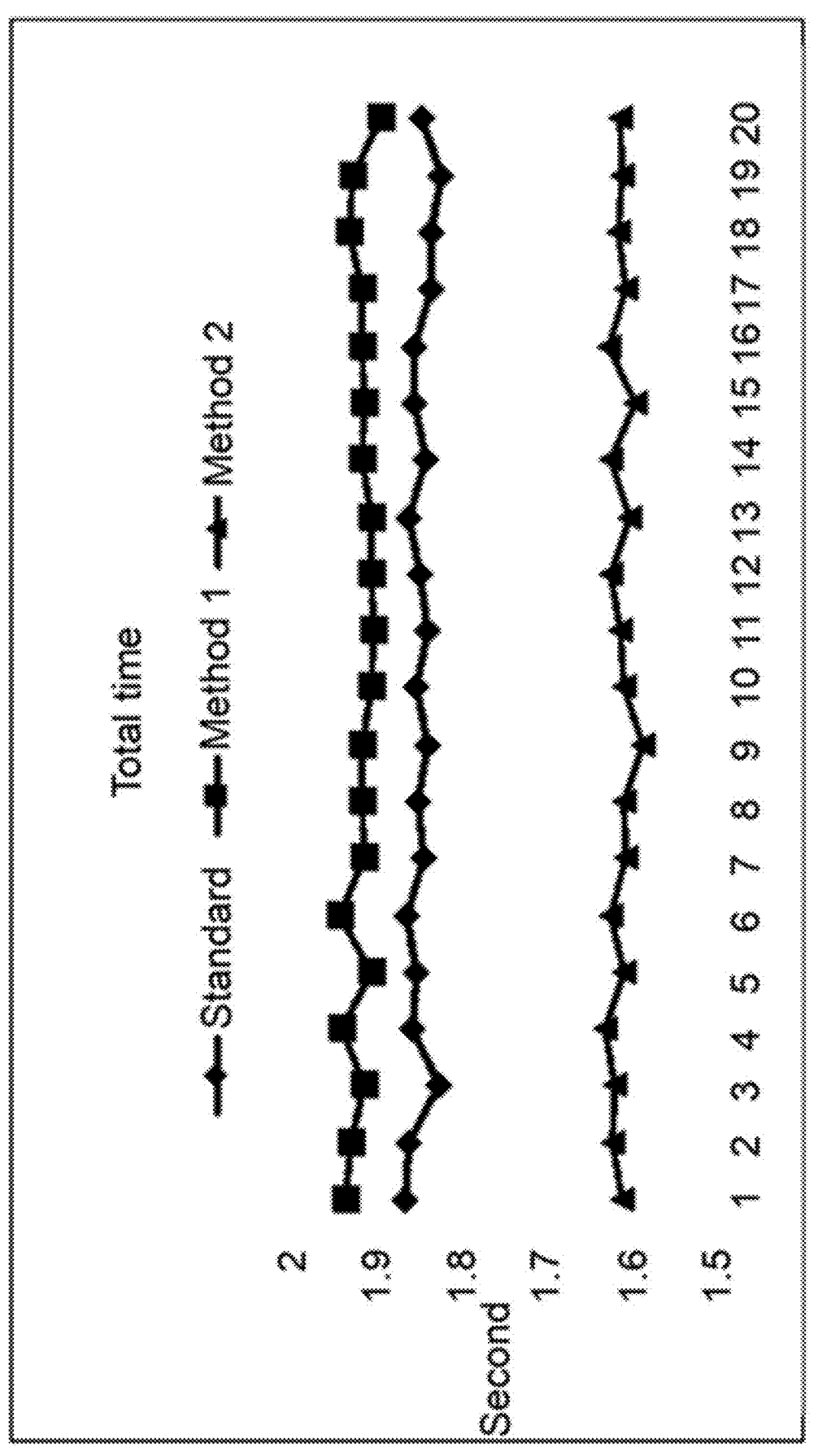

The performance of the method of the present disclosure in terms of speed is analyzed below with reference to FIG. 5A to FIG. 5C. FIG. 5A to FIG. 5C respectively show schematic diagrams of effects of methods according to some embodiments of the present disclosure. New code that implements the log output function described herein is usually not limited by a CPU, and therefore, it usually does not add too much time. On the contrary, as described in the example 400, some implementations of the function can even reduce the number of IO function calls by merging buffered log messages in the memory and outputting them together.

A time comparison chart of three implementations that output 300000 rows of log messages 20 times. FIG. 5A shows the time consumption of a user, FIG. 5B shows the time consumption of a system, and FIG. 5C shows the total time consumption. The diamond represents a logging system without porting the log output function of the present disclosure, the square represents the method 1 described in the example 300, and the triangle represents the method 2 described in the example 400. As can be seen in FIG. 5A, the method 1 takes an average time more than the logging system without porting the log output function of the present disclosure and the method 2. This is because the method 1 requires additional code to run in the adapter, so it takes some time. The average time of the logging system without porting the log output function of the present disclosure is similar to that of the method 2, which also proves that the method 2 does not increase too much CPU workload. In FIG. 5B, the method 2 takes significantly less time compared with the logging system without porting the log output function of the present disclosure and the method 1. This is because the log messages in the buffer region are connected as much as possible and output together in one IO call, thereby reducing the time spent in the kernel. The method 1 does not have this benefit, and therefore, on average, it takes almost the same system time as the logging system without porting the log output function of the present disclosure. FIG. 5C shows that the method 2 clearly takes the least amount of time, while the method 1 takes approximately 4% more time than the logging system without porting the log output function of the present disclosure.

Figure 6:
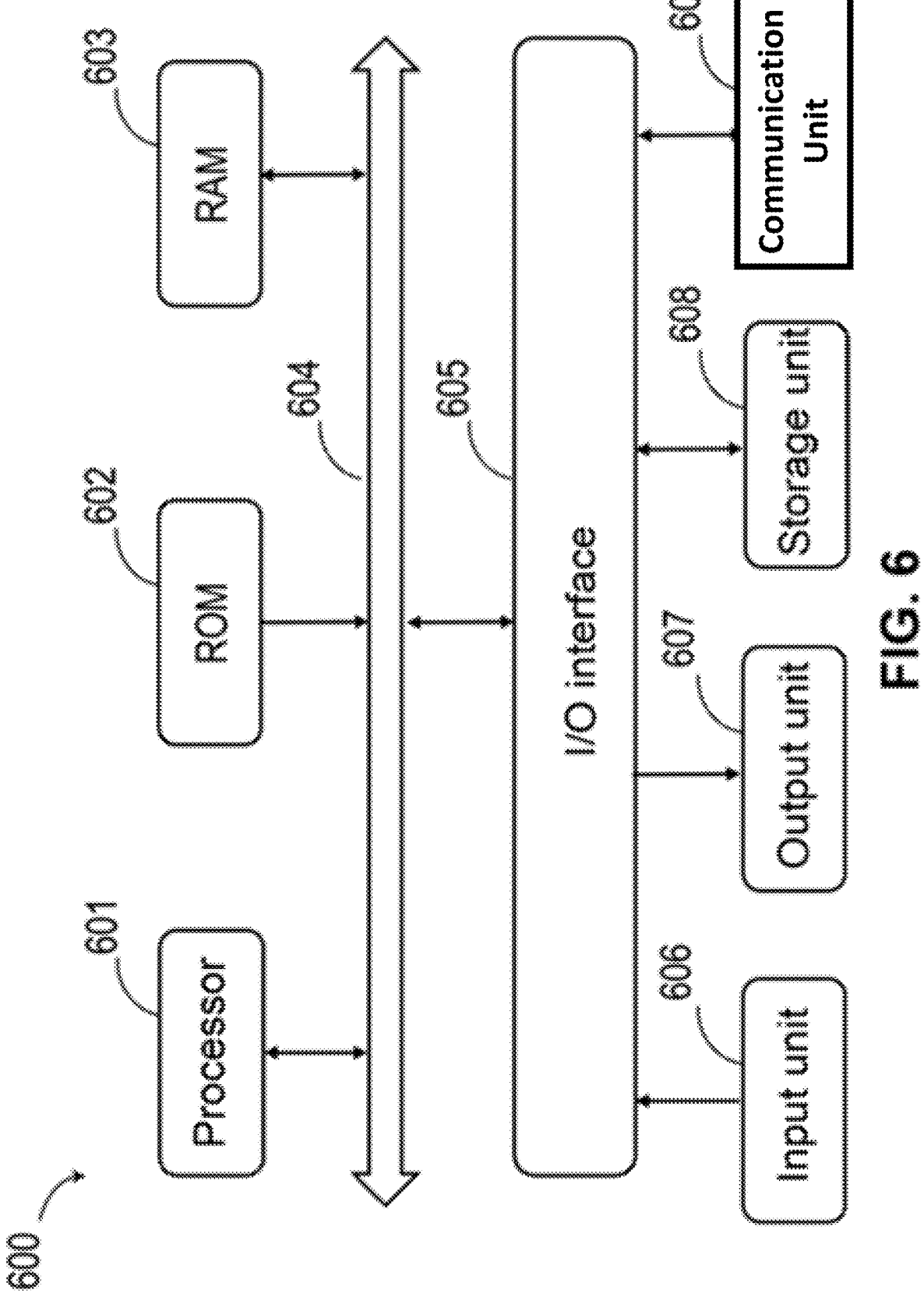
FIG. 6 shows a schematic block diagram of an example device that is suitable for implementing example embodiments of the present disclosure.

FIG. 6 illustrates a schematic block diagram of an example device 600 that can be used to implement the embodiments of the present disclosure. As shown in the figure, the device 600 includes a processor 601 that may execute various appropriate actions and processing according to computer program instructions stored in a read-only memory (ROM) 602 or computer program instructions loaded from a storage unit 608 to a random access memory (RAM) 603. Various programs and data required for the operation of the storage device 600 may also be stored in the RAM 603. The processor 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The processor 601 may be various general-purpose and/or special-purpose processing components with processing and computing capabilities. Some examples of the processor 601 include, but are not limited to, a central processing unit (CPU), a graphics processing unit (GPU), various specialized artificial intelligence (AI) computing chips, various processors for running machine learning model algorithms, a digital signal processor (DSP), and any appropriate processor, controller, microcontroller, and the like. The processor 601 performs various methods and processes described above, such as the method 300. For example, in some embodiments, the method 300 may be implemented as a computer software program that is tangibly included in a machine-readable medium such as the storage unit 608. In some embodiments, part of or all the computer program can be loaded and/or installed onto the device 600 via the ROM 602 and/or the communication unit 609. When the computer program is loaded onto the RAM 603 and executed by the processor 601, one or more steps of the method 200 described above may be performed. Alternatively, in other embodiments, the processor 801 may be configured to perform the method 200 by any other suitable manners (e.g., by means of firmware).

The functions described hereinabove may be executed at least in part by one or more hardware logic components. For example, without limitation, example types of hardware logic components that can be used include: a field programmable gate array (FPGA), an application specific integrated circuit (ASIC), an application specific standard product (ASSP), a system on chip (SOC), a load programmable logic device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flowcharts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the particular features and actions described above are merely example forms of implementing the claims.

What is claimed is:

1. A method, comprising:
outputting logs from a logging system comprising at least one processor, the logging system being set with a primary filtering level and a secondary filtering level, the outputting comprising:
saving a log message in a log stream with a log level higher than or equal to the secondary filtering level in a buffer region;
outputting, in response to a log filtering flag being determined to be set to the primary filtering level, the log message in the buffer region with the log level higher than or equal to the primary filtering level to a target region; and
outputting all log messages in the buffer region to the target region in response to the log filtering flag being determined to be set to the secondary filtering level.

2. The method of claim 1, the outputting further comprising:
changing, in response to the log level of the log message being determined to be higher than or equal to a threshold log level, the log filtering flag from the primary filtering level to the secondary filtering level;
clearing the buffer region in response to the log filtering flag being determined to have changed to the secondary filtering level; and
outputting a subsequently incoming log message to the target region.

3. The method of claim 1, the outputting further comprising:

outputting, in response to the number of the log messages in the buffer region being determined to exceed a threshold number, a part of the log messages in the buffer region that exceeds the threshold number from the buffer region to the target region based on the log filtering flag; and
deleting the part of the log messages in the buffer region that exceeds the threshold time range.

4. The method of claim 1, the outputting further comprising:
outputting, in response to the time of the log messages in the buffer region residing in the buffer region being determined to exceed a threshold time, a part of the log messages in the buffer region that exceeds the threshold time from the buffer region to the target region based on the log filtering flag; and
deleting the part of the log messages in the buffer region that exceeds the threshold time.

5. The method of claim 1, the outputting further comprising:
outputting, in response to being instructed to output the log messages and to clear the buffer region, the log messages from the buffer region to the target region and clearing the buffer region based on the log filtering flag.

6. The method of claim 5, the outputting further comprising:
changing the log filtering flag to the primary filtering level in response to determining that the outputting of the log messages and the clearing of the buffer region have completed.

7. The method of claim 1, the outputting further comprising:
recording offsets and lengths of the log messages in the buffer region in a meta array;
merging, in response to the log filtering flag being determined to be the primary filtering level, the lengths of a group of consecutive log messages in the buffer region into one length in the meta array; and
merging, in response to the log filtering flag being determined to be the secondary filtering level, the lengths of all the log messages in the buffer region into one length in the meta array.

8. A device, comprising:
at least one processor; and
at least one memory coupled to the at least one processor and having instructions for outputting logs from a logging system stored thereon, the logging system being set with a primary filtering level and a secondary filtering level, wherein the instructions, when executed by the at least one processor, cause a device to perform operations, comprising:
saving a log message in a log stream with a log level higher than or equal to the secondary filtering level in a buffer region;
outputting, in response to a log filtering flag being set to the primary filtering level, the log message in the buffer region with the log level higher than or equal to the primary filtering level to a target region; and
outputting all log messages in the buffer region to the target region in response to the log filtering flag being set to the secondary filtering level.

9. The device of claim 8, wherein the operations further comprise:
changing, in response to the log level of the log message being higher than or equal to a threshold log level, the log filtering flag from the primary filtering level to the secondary filtering level;

clearing the buffer region in response to the log filtering flag changed to the secondary filtering level; and outputting a subsequently incoming log message to the target region.

10. The device of claim 8, wherein the operations further comprise:

outputting, in response to the number of the log messages in the buffer region exceeding a threshold number, a part of the log messages in the buffer region that exceeds the threshold number from the buffer region to the target region based on the log filtering flag; and deleting the part of the log messages in the buffer region that exceeds the threshold number.

11. The device of claim 8, wherein the operations further comprise:

outputting, in response to the time of the log messages in the buffer region residing in the buffer region exceeding a threshold time, a part of the log messages in the buffer region that exceeds the threshold time from the buffer region to the target region based on the log filtering flag; and deleting the part of the log messages in the buffer region that exceeds the threshold time.

12. The device of claim 8, wherein the operations further comprise:

outputting, in response to instructions for outputting the log messages and clearing the buffer region, the log messages from the buffer region to the target region and clearing the buffer region based on the log filtering flag.

13. The device of claim 12, wherein the operations further comprise:

changing the log filtering flag to the primary filtering level in response to completion of the outputting of the log messages and the clearing of the buffer region.

14. The device of claim 8, wherein the operations further comprise:

recording offsets and lengths of the log messages in the buffer region in a meta array;

merging, in response to the log filtering flag being the primary filtering level, the lengths of consecutive log messages in the buffer region into one length in the meta array; and merging, in response to the log filtering flag being the secondary filtering level, the lengths of all the log messages in the buffer region into one length in the meta array.

15. A computer program product, the computer program product being stored on a non-transitory computer-readable medium and comprising machine-executable instructions for outputting logs from a logging system, the logging system being set with a primary filtering level and a secondary filtering level, wherein the machine-executable instructions, when executed, cause a machine to perform actions, comprising:

saving a log message in a log stream with a log level that is at least equal to the secondary filtering level in a buffer region;

outputting, in response to a log filtering flag being set to the primary filtering level, the log message in the buffer region with the log level that is at least equal to the primary filtering level to a target region; and outputting all log messages in the buffer region to the target region in response to the log filtering flag being set to the secondary filtering level.

16. The computer program product of claim 15, wherein the actions further comprise:

changing, in response to the log level of the log message being at least equal to a threshold log level, the log filtering flag from the primary filtering level to the secondary filtering level;

clearing the buffer region in response to the log filtering flag changed to the secondary filtering level; and outputting a subsequently incoming log message to the target region.

17. The computer program product of claim 15, wherein the actions further comprise:

outputting, in response to the number of the log messages in the buffer region exceeding a threshold number, a group of the log messages in the buffer region that exceeds the threshold number from the buffer region to the target region based on the log filtering flag; and deleting the group of the log messages in the buffer region that exceeds the threshold number.

18. The computer program product of claim 15, wherein the actions further comprise:

outputting, in response to the time of the log messages in the buffer region residing in the buffer region exceeding a threshold time, a group of the log messages in the buffer region that exceeds the threshold time from the buffer region to the target region based on the log filtering flag; and deleting the group of the log messages in the buffer region that exceeds the threshold time.

19. The computer program product of claim 15, wherein the actions further comprise:

outputting, in response to instructions for outputting the log messages and clearing the buffer region, the log messages from the buffer region to the target region and clearing the buffer region based on the log filtering flag.

20. The computer program product of claim 15, wherein the actions further comprise:

recording offsets and lengths of the log messages in the buffer region in a meta array;

merging, in response to the log filtering flag being the primary filtering level, the lengths of a plurality of consecutive log messages in the buffer region into one length in the meta array; and merging, in response to the log filtering flag being the secondary filtering level, the lengths of all the log messages in the buffer region into one length in the meta array.

* * * * *